(12) United States Patent
Lang et al.

(10) Patent No.: US 11,187,863 B2
(45) Date of Patent: Nov. 30, 2021

(54) FLAT OPTICAL DROP CABLE

(71) Applicant: Prysmian S.p.A., Milan (IT)

(72) Inventors: Ian Dewi Lang, Milan (IT); George Stephen Lucas, Milan (IT); Nathan Paddick, Milan (IT); Martin Vincent Davies, Milan (IT)

(73) Assignee: Prysmian S.P.A, Milan (IT)

( * ) Notice: Subject to any disclaimer, the term of this patent is extended or adjusted under 35 U.S.C. 154(b) by 0 days.

(21) Appl. No.: 16/645,623

(22) PCT Filed: Sep. 11, 2017

(86) PCT No.: PCT/EP2017/072761
§ 371 (c)(1),
(2) Date: Mar. 9, 2020

(87) PCT Pub. No.: WO2019/048069
PCT Pub. Date: Mar. 14, 2019

(65) Prior Publication Data
US 2020/0285011 A1    Sep. 10, 2020

(51) Int. Cl.
*G02B 6/44* (2006.01)
(52) U.S. Cl.
CPC ......... *G02B 6/4433* (2013.01); *G02B 6/4486* (2013.01)

(58) Field of Classification Search
CPC ........................ G02B 6/4486; G02B 6/4433
See application file for complete search history.

(56) References Cited

U.S. PATENT DOCUMENTS

| 2006/0147164 A1 | 7/2006 | Bau et al. |
| 2007/0025668 A1 | 2/2007 | Greenwood et al. |
| 2014/0241677 A1* | 8/2014 | Sutehall ........... B29D 11/00701 385/104 |

FOREIGN PATENT DOCUMENTS

| EP | 2184630 A1 | 5/2010 | |
| WO | 2010109339 A1 | 9/2010 | |
| WO | WO-2010109339 A1 * | 9/2010 | ........... H02G 3/0418 |
| WO | 2015193696 A1 | 12/2015 | |
| WO | 2017021336 A1 | 2/2017 | |

* cited by examiner

*Primary Examiner* — Sung H Pak
*Assistant Examiner* — Hoang Q Tran
(74) *Attorney, Agent, or Firm* — Slater Matsil, LLP

(57) ABSTRACT

In one embodiment, an optical cable, which is a flat drop cable, includes a cavity shaped in the form of a stadium in a sectional view of the optical cable. The cable further includes an outer sheath enclosing the cavity, a first strength member, and a first optical fiber element disposed in the cavity. The first optical fiber element includes an optical fiber and has an oscillating pattern within the cavity on an oscillation plane parallel to a longitudinal plane of the cable. The height of the cavity in the sectional view substantially corresponds to a height of the first optical fiber element.

20 Claims, 10 Drawing Sheets

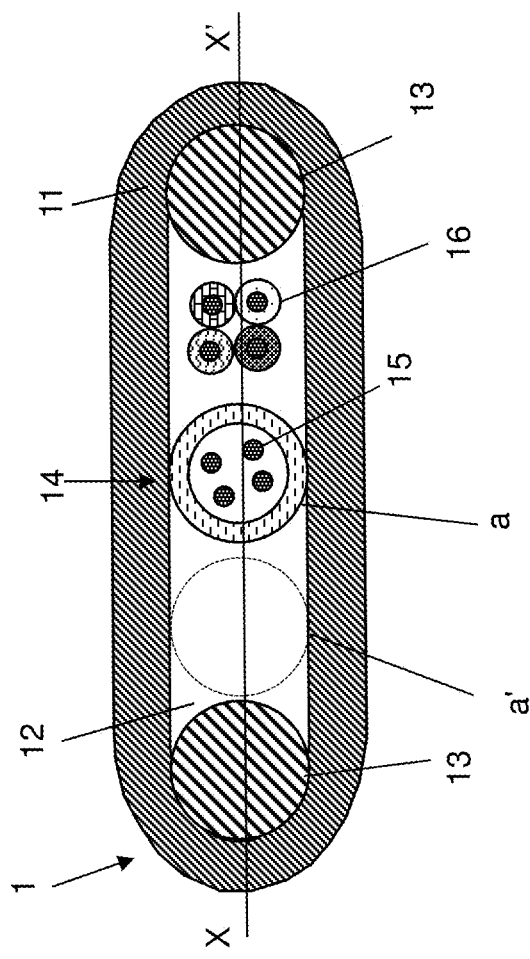
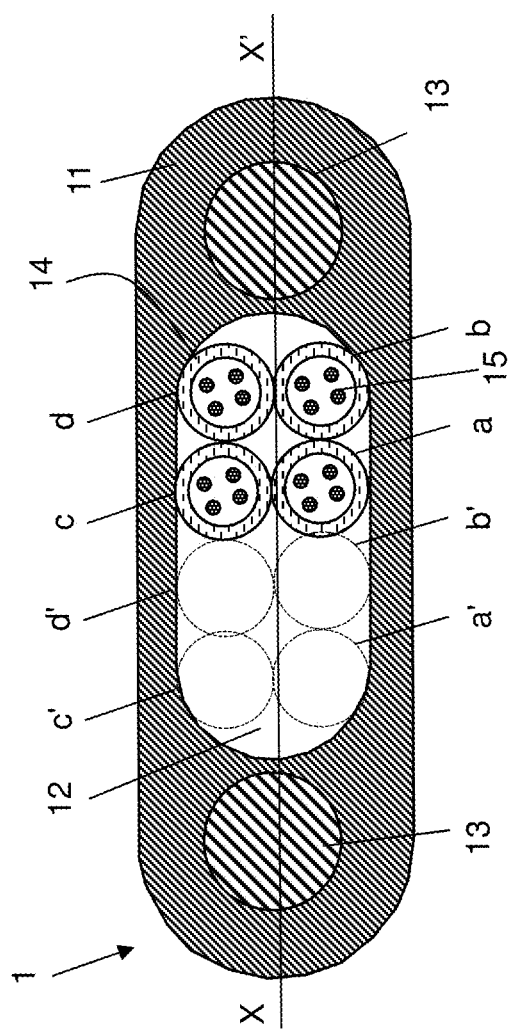

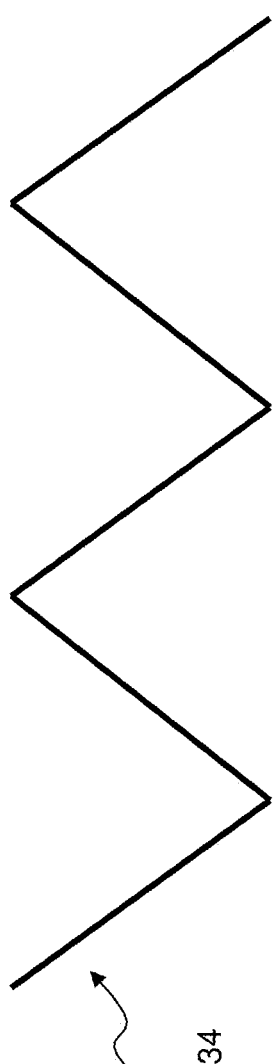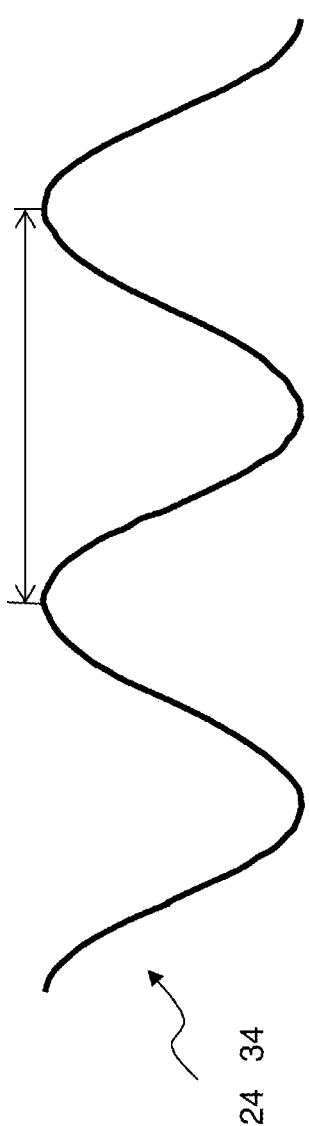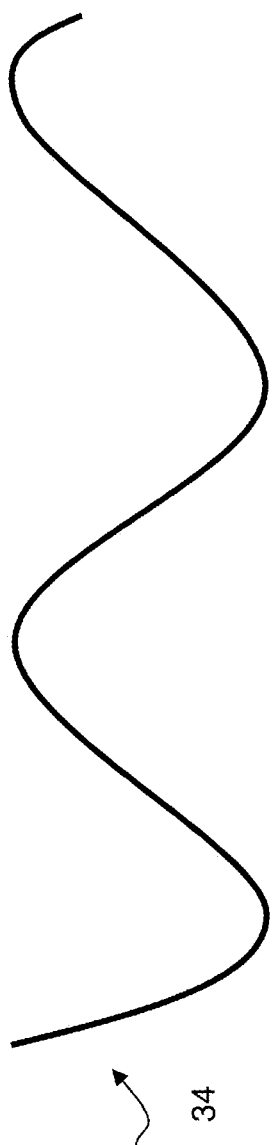

FLAT OPTICAL DROP CABLE

CROSS-REFERENCE TO RELATED APPLICATIONS

This application is a national stage of International Application No. PCT/EP2017/072761, filed on Sep. 11, 2017, which application is hereby incorporated herein by reference in its entirety.

TECHNICAL FIELD

The present invention relates to the field of cables. In particular, the present invention relates to a flat optical drop cable for FTTX (Fiber-To-The-X) applications, a process and an apparatus for manufacturing such flat optical drop cable.

BACKGROUND

As known, in FTTX applications, optical drop cables are located on the subscriber end to connect the terminal of a distribution cable to a subscriber's premises. They typically comprise an outer jacket surrounding a number of optical fibers and two strength members. The optical fibers may be housed in a buffer tube. Optical drop cables are typically installed in ducts or used in aerial installations. Hence, they shall withstand strains under the environmental load (due to, e.g., gravity and weather conditions) without inducing stresses on the optical fibers comprised therein so as not to cause attenuation of the signals transmitted in the optical fibers.

An example of a typical commercial flat drop cable is the cable known as ResiLink™ ADF-Flat Drop Dielectric, an all dielectric flat drop cable manufactured by the Prysmian Group, 700 Industrial Drive, Lexington, S.C. 29072. This cable comprises an HDPE (High Density Polyethylene) outer jacket, two strength members and a buffer tube housing up to 12 optical fibers. Another example of a typical commercial flat drop cable is the SST-Drop™ Dielectric Cable manufactured by Corning Cable Systems LLC, PO Box 489, Hickory, N.C. 28603-0489 USA. This cable comprises a PE (Polyethylene) outer jacket, two dielectric strength members and a buffer tube housing 1-12 optical fibers.

Further examples of optical drop cables are disclosed in the documents listed herein below.

WO 2015/193696 discloses cable assemblies that may be used in environments that have extreme temperature variations, including very low, sub-zero temperatures are described. More particularly, jacketed cable assemblies having both fibers and strength members, with channels built between the fibers and the cable jacket are described.

EP 2 184 630 discloses a method of forming a low-cost drop cable. The method includes providing a protective cover material (352) having an extrusion temperature of 140° C.≤TE≤160° C. The protective cover material is extruded through a die having a single aperture that defines the cable's elongate cross-sectional shape. The extrusion process involves covering first and second strength members on either side of at least one optical fiber. The combination of the low temperature of the extrudable protective cover material and the elongate shape of the single die aperture cause the formation of an oval cavity within the extruded protective cover material. The oval cavity has major and central axes and surrounds the at least one optical fiber. The strength members lie along the cavity major axis. Tensioning the strength members during extrusion and then releasing the tension causes the drop cable length to be reduced. This gives rise to an excess fiber length, which adopts a serpentine configuration substantially in a plane defined by the major and central axes of the oval cavity.

SUMMARY

In one embodiment, an optical cable, which is a flat drop cable, includes a cavity shaped in the form of a stadium in a sectional view of the optical cable. The cable further includes an outer sheath enclosing the cavity, a first strength member, and a first buffer tube disposed in the cavity. The first buffer tube includes an optical fiber and has an oscillating pattern within the cavity on an oscillation plane parallel to a longitudinal plane of the cable. The height of the cavity in the sectional view substantially corresponds to a height of the first buffer tube.

In another embodiment, a process for manufacturing an optical cable includes providing a first strength member and a first buffer tube comprising an optical fiber, moving the first buffer tube to provide an oscillating motion to the first buffer tube, and forming the optical cable to be a flat drop cable by extruding an outer sheath about the first strength member and the first buffer tube, wherein the extruding comprising capturing the oscillating motion of the first buffer tube in an oscillating pattern within a cavity enclosed by the outer sheath, the cavity being shaped in the form of a stadium and having a height substantially corresponding to a height of the first buffer tube.

In another embodiment, an apparatus for manufacturing an optical cable includes a first pay-off machine for providing a first buffer tube, a second pay-off machine for providing a first strength member, an oscillator for moving the first buffer tube to provide an oscillation motion to the first buffer tube, and an extrusion head for forming the optical cable to be a flat drop cable by extruding an outer sheath about the first strength member and the first buffer tube. The extrusion head is configured to extrude by capturing the oscillating motion of the first buffer tube in an oscillating pattern within a cavity enclosed by the outer sheath, the cavity being shaped in the form of a stadium and having a height substantially corresponding to a height of the first buffer tube.

BRIEF DESCRIPTION OF THE DRAWINGS

The present invention will become fully clear by reading the following detailed description, to be read by referring to the accompanying drawings, wherein:

FIG. 5 schematically shows a cross-section of a flat optical drop cable according to a second variant of the first embodiment of the present invention;

FIG. 6 schematically shows a cross-section of a flat optical drop cable according to a third variant of the first embodiment of the present invention;

FIGS. 12a, 12b and 12c show exemplary patterns (oscillations) of the optical elements of the cables of the present invention

DETAILED DESCRIPTION OF ILLUSTRATIVE EMBODIMENTS

Figure 1:
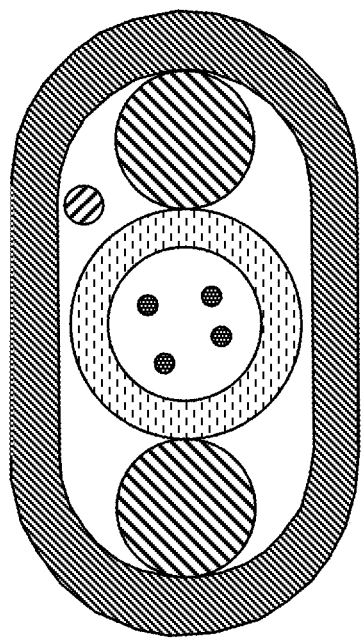
FIG. 1 schematically shows a cross-section of a flat optical drop cable according to a standard cable design.

In the present description and claims, unless otherwise specified, all the numbers and values should be intended as preceded by the term "about". Also, all ranges include any combination of the maximum and minimum points disclosed and include any intermediate ranges therein, which may or may not be specifically enumerated herein.

The Applicant noticed that typical flat optical drop cables are capable of withstanding strains by using large strength members with high Young's modulus and low coefficient of thermal expansion. However, using this kind of strength members typically leads to increased cable dimensions.

Further, the Applicant noticed that the cable of EP 2 184 630 has an oval cavity formed in the cover material and includes two rod-like support members on respective sides of the cavity. At least one optical fiber is contained in the cavity, which is supported in a substantially serpentine (i.e. substantially sinusoidal) configuration. Having oval cavity allows the optical fiber to have an increased excess fiber length (EFL) with respect to having a circular cavity, which allows for the cable to be more robust with respect to flexibility and temperature cycling. Moreover, the method disclosed in EP 2 184 630 allows providing a drop cable having a reduced cross-sectional area. Also, the buffering process step is eliminated by feeding the optical fibers directly into the protective cover.

Furthermore, the Applicant noticed that the cable of WO 2015/193696 comprises a channel of a racetrack shape, which is formed in the outer jacket, and two strength members located within the jacket. The channel houses an optical fiber. The channel and the optical fiber oscillate in relation to the strength members along the length of the cable. As disclosed in WO 2015/193696, the channel is large enough so that the fiber need not be in contact with any one of the channel walls. The oscillating configuration of the channel and of the optical fiber housed therein allows the cable to be flexible at cold temperatures without causing strains on the optical fiber. Indeed, it allows accommodating the surplus length of the fiber generally created at low temperatures due to the different coefficient of thermal expansion between the fiber and the jacket.

Finally, the Applicant noticed that in the cable of either EP 2 184 630 and WO 2015/193696 the optical fibers are housed directly within the channel or cavity provided in the outer jacket without being retained by the jacket. Indeed, the optical fibers oscillate in the plane comprising the longitudinal axis of the cable and the strength members, but they are also allowed to move in other directions, such as the direction perpendicular to the cited plane. Therefore, if the cable is installed at a given inclination with respect to the horizontal direction, the optical fibers may migrate within the channel or cavity. Such migration may cause tension in connectors or splices which may cause damage to the optical fibers. Additionally, fiber migration results in sections of the cable with different fiber excess, namely sections where the fiber excess is high and sections where the fiber excess is low. In sections where there is a high fiber excess, the fibers curl in the tubes resulting in attenuation. In sections where there is low fiber excess, the fiber becomes sensitive to environmental loads.

In view of the above, the Applicant has tackled the problem of providing a flat optical drop cable which allows overcoming the drawbacks set forth above. In particular, the Applicant has tackled the problem of providing a flat optical drop cable capable of withstanding strains due to the environmental load without inducing stress on the optical fibers, which has a reduced size with respect to typical flat optical drop cables and which allows minimizing the optical fiber migration inside the cable.

In the present description and in the claims, the term "flat cable" denotes a cable in which the internal elements are arranged with longitudinal axes that are substantially parallel and lie in the same plane or in close parallel planes. Typically, the shape of the cross section of a flat cable, considered on a plane transverse to the longitudinal axis of the cable, is substantially rectangular. It preferably has rounded edges. The major side of this cross section is referred to as the width of the cable and the minor side is referred to as the height of the cable.

In one aspect, the present invention relates to a flat optical drop cable comprising: an outer sheath forming a cavity, the cavity being shaped in the form of a stadium; at least one strength member; and at least one optical fiber element comprising one or more optical fibers, wherein the at least one optical fiber element oscillates within the cavity on an oscillation plane parallel to a longitudinal plane of the cable, and wherein an height of the cavity substantially corresponds to an height of the at least one optical fiber element.

Preferably, the cavity comprises two opposite curved sides, and one of the at least one strength member is located in correspondence of one of the opposite curved sides of the cavity.

Preferably, the at least one strength member comprises a GRP rod or a yarn or stranded steel wires.

Preferably, the at least one optical fiber element oscillates within the cavity according to a sinusoidal pattern or a zig zag pattern.

Preferably, a diameter of the at least one optical fiber element is comprised between 0.5 mm and 3.0 mm, a period of oscillation of the at least one optical fiber element is comprised between 30 mm and 300 mm and a ratio between a peak-to-peak amplitude of said oscillation and the width of said at least one optical fiber element is comprised between 1.3 and 5.

According to an embodiment of the present invention, the cable comprises two strength members located inside the cavity, each one of the two strength members being located at a respective one of the opposite curved sides of the cavity. Preferably, the at least one optical fiber element is a loose tube enclosing the one or more optical fibers.

According to another embodiment of the present invention, the cable comprises two strength members embedded within the outer sheath, each one of the two strength members being located in the vicinity of a respective one of the opposite curved sides of the cavity. Preferably, the at least one optical fiber element is a tight fiber bundle comprising one or more optical fibers.

According to a further embodiment of the present invention, the at least one optical fiber element is a sub-unit comprising a single fiber cable.

Preferably, the cavity comprises two opposite elongated sides, and the cable comprises, in a portion of the outer sheath over one of the elongated sides, a stripe suitable for identifying the cable, and wherein the outer sheath comprises two concave ridges forming, together with the stripe and easy-peel window.

In a further aspect, the present invention relates to a process for manufacturing a flat optical drop cable, the process comprising: providing at least one strength member and at least one optical fiber element; moving the optical fiber element to provide an oscillation pattern of the optical fiber element; and extruding an outer sheath about the at least one strength member and the at least one optical fiber element so as to form a cavity into which the at least one optical fiber element may oscillate, the cavity being shaped in the form of a stadium and having a height substantially corresponding to an height of the at least one optical fiber element.

In an even further aspect, the present invention relates to an apparatus for manufacturing a flat optical drop cable, the apparatus comprising: a first pay-off machine for providing at least one optical fiber element; a second pay-off machine for providing at least one strength member; an oscillator for moving the optical fiber element to provide an oscillation pattern of the optical fiber element; and an extrusion head for extruding an outer sheath about the at least one strength member and the at least one optical fiber element so as to form a cavity into which the at least one optical fiber element may oscillate, the cavity being shaped in the form of a stadium and having a height substantially corresponding to an height of the at least one optical fiber element.

Preferably, the extrusion head comprises a core tube and a die the core tube comprising at least one hole for passing the at least one strength member and a horizontal slot for passing the at least one optical fiber element and maintaining fixed in an oscillation plane the at least one optical fiber element as it moves according to the oscillation pattern.

Preferably, the apparatus further comprises a cooling trough comprising a water cooling trough, the water cooling trough being a vacuum trough in which the water is at lower pressure than the atmosphere inside the cable.

The present invention provides a flat optical drop cable comprising: an outer sheath forming a cavity, the cavity being a shaped in the form of a stadium, as it will be described in greater detail herein after; at least one strength member; and at least one optical fiber element comprising one or more optical fibers.

Preferably, each optical element oscillates within the cavity on a plane of oscillation, the plane of oscillation or oscillation plane being parallel to the plane comprising the longitudinal axis of the cavity and the longitudinal axes of the strength members (which will be indicated as longitudinal plane of the cable). Each optical element oscillates according to a pre-defined pattern of oscillation. Moreover, the optical element(s) are retained by the outer sheath on their oscillation plane and are hence held in a fixed position (namely, they are prevented from moving when the cable is installed at an inclination). This is due to the fact that a height of the at least one optical element is substantially equal to a height of the cavity, as it will be described in greater detail herein after.

It should be remarked that the verb "oscillate" as used in the present description and claims, typically in connection with optical elements, does not mean that the optical elements perform an oscillation movement in the cable. The verb "oscillate" refers to a static configuration or pattern of an element (typically an optical element) in a confined space, typically in the cavity of a sheath or the like. FIGS. 12a, 12b and 12c show, exemplary patterns of the optical elements of the cables of the present invention.

In the following description and in the claims, the expression "height of the at least one optical fiber element" or "element height" will indicate a dimension of the at least one optical fiber element along a direction perpendicular to the longitudinal plane of the cable. In case of a single optical fiber element or multiple optical fiber elements placed side by side within the cavity on the longitudinal plane of the cable, the height of the at least one optical fiber element is the diameter of the optical fiber element. In case of stacked optical fiber elements (namely, multiple optical fiber elements laying on different planes parallel to the longitudinal plane of the cable), the height of the at least one optical fiber element corresponds substantially to the sum of the diameters of the stacked optical fiber elements.

The pattern of oscillation may be a "zig zag" (or sawtooth) pattern as shown in FIG. 12a or a sinusoidal pattern as shown in FIG. 12b, or it may be a random pattern as shown in Figure c.

According to the present invention, the optical fiber element may be a loose tube (or, buffer tube) enclosing the optical fibers, or a tight fiber bundle comprising the optical fibers, or it may consists in the bare optical fibers. The number of optical fiber elements inside the cable may vary from 1 to 12. The number of fibers inside each optical fiber element may vary from 1 to 12. Hence, the number of fibers inside the cable may vary between 1 and 144. Preferably, the number of fibers of the cable varies between 1 and 48 (e.g. it may be equal to 36), and more preferably between 1 and 12.

According to the present invention, the diameter of the optical element may range from 0.5 mm to 3.0 mm.

Preferably, the outer sheath is made of a polymer material. More preferably the polymer material is one or a combination of: PE (Polyethylene), PELD (Polyethylene Low-Density), PP (Polypropylene), PA (Polyamide), LSOH (Low Smoke Zero Halogen) polymer.

Preferably, the outer sheath has a thickness of from 0.10 mm to 4.50 mm. A preferred value for the sheath thickness is 0.75 mm.

The number of strength members inside the flat drop optical cable according to the present invention may be 1 to 6. The strength members may be in the form of GRP (Glass Reinforced Plastic) rods, or yarns, or stranded steel wires. Exemplary yarns are aramid yarns of linear density of 3220 dtex provided by Teijin Aramid, or glass yarns of linear density of 1600 dtex provided by Gotex S.A. The stranded steel wires may be brass clad or copper clad steel wires helically wound together. According to different embodiments of the present invention, the strength members may be located inside the cavity or they may be embedded in the outer sheath.

Preferably, the flat drop optical cable may contain one or more ripcords (in particular 1-4 ripcords). Preferably, the flat drop optical cable may contain water-blocking elements, such as one or more of the following: yarns, polyacrylate powder, tape, gel.

According to the present invention, the cable width may be from 1.5 mm to 14.5 mm. The cable height may be from 1.0 mm to 11 mm. In a cable with a single optical element, the cable width may be 4.0 mm-10.0 mm and the height may be 1.5 mm-5.5 mm. More detailed examples of cable will be given in the following description, with reference to the different embodiments that will be described.

As mentioned above each optical fiber element is oscillating within the cavity of the flat drop optical cable of the present invention, according to a pre-defined pattern of oscillation. A preferred oscillation pattern is a sinusoidal pattern. The oscillation pattern of an optical fiber element may have a period of oscillation ranging between 30 mm and 300 mm, and a peak-to-peak amplitude to element width ratio ranging between 1.3 and 5.0, the peak-to-peak amplitude of the oscillation pattern being defined as the distance between the two farthest positions that the optical fiber element may take within the cavity on the oscillation plane, measured along a line orthogonal to the longitudinal axis about which the element oscillates with the given period.

In the present description and in the claims, the expression "width of the at least one optical fiber element" or "element width" will indicate a dimension of the at least one optical fiber element along a direction parallel to the longitudinal plane of the cable. In case of a single optical fiber element or 2 stacked optical fiber elements, the width of the at least one optical fiber element is the diameter of the optical fiber element. In case of multiple optical fiber elements placed side by side on, or parallel with, the longitudinal plane of the cable, the width of the at least one optical fiber element corresponds substantially to the sum of the diameters of the fiber elements placed side by side.

In the following description and in the claims, the expression "cavity shaped in the form of a stadium" or "stadium-shaped cavity" will indicate a cavity having the shape of an elongated rectangle wherein each minor side of the elongated rectangle is substantially an arc of a circumference, the arc being the same at the opposite sides of the cavity. The center of each arc lies substantially in the longitudinal plane of the cable. In the present description and in the claims, the expression "height of the cavity" will indicate the distance between the two major sides of the elongated rectangle, while the expression "width of the cavity" will indicate the maximum dimension of the cavity in the longitudinal plane of the cable.

In the following description, a number of cables according to different embodiments of the present invention will be described for sake of example.

The cables that will be described in the following have been designed by the inventors by investigating their performance according to the following theoretical calculations.

Indeed, assuming a tensile load F and a temperature increase $\Delta T$, it is possible to calculate the resulting cable strain SC and the required geometry to prevent fiber tensile loading. The cable strain SC results from the combination of the tensile strain and the thermal strain. Hence, the cable strain SC may be approximated as the sum of the two mentioned strains as follows:

$$SC = (F/(A \times E)) + (\Delta T \times a) \quad [1]$$

wherein F is the tensile load, A is the cross section area of the strength members, E is the Young's modulus of the strength members, $\Delta T$ is the temperature increase and a is the coefficient of thermal expansion of the strength members.

A cable strain relief may be calculated as the ratio between the length of the excess optical fiber element (element over-feed) and the length of the cable. If a quarter of the period P is considered as the cable length and the over-feed is modeled as a zig zag pattern, the cable strain relief may be approximated as:

$$\left[\sqrt{(L-D_E)^2 + \left(\frac{P}{4}\right)^2} - \frac{P}{4}\right] / \left(\frac{P}{4}\right) \quad [2]$$

wherein L is the distance between the strength members and DE is the optical element diameter.

By equating the cable strain and the cable strain relief it is possible to compute the required period P for preventing fiber tensile loading. Indeed, the required period P may be computed as a function of the cable strain, the distance between the strength members and the optical fiber element diameter as follows:

$$P = 4\sqrt{\frac{(L-D_E)^2}{(SC^2 + 2 \cdot SC)}} \quad [3]$$

Moreover, if the optical fiber element is a buffer tube housing a number of fibers, there may be a fiber excess or fiber over-feed, $E_F$ inside the buffer tube. Besides, as known, the allowable fiber working strain, $S_{FW}$, indicates the maximum fiber strain that does not cause signal attenuation or that does not impact on the cable lifetime. In view of the above, the fiber strain S may be approximated by taking into consideration the factors above, as follows:

$$S = SC - E_F - S_{FW} \quad [4]$$

By considering then the fiber strain S, the required period P may be computed as follows:

$$P = 4\sqrt{\frac{(L-D_E)^2}{(S^2 + 2 \cdot S)}} \quad [5]$$

During the tests performed by the inventors, performance of the cables that have been designed according to the embodiments of the present invention has been compared with corresponding performance based on an exemplary standard flat optical drop cable whose cross section may be schematically represented as in FIG. 1. The standard cable used for comparison comprises a PE outer sheath, two dielectric (GRP) strength members and a buffer tube housing a number of optical fibers. The buffer tube is retained between the two strength members, within the outer sheath. The standard cable used for comparison has a width equal to 8.1 mm, a height of 4-5 mm, a sheath thickness of 0.75 mm, and a cross section area of 37.5 mm². The buffer tube diameter is equal to 3.0 mm. The standard cable has been subject to different loads up to a maximum installation load of 1350 N and to a temperature increase of 40° C. Assuming that the buffer tube has a fiber excess of 0.04% and that the allowable fiber working strain is reached at the maximum installation load, the allowable working strain $S_{FW}$ was found to be 0.51%.

Figure 2:
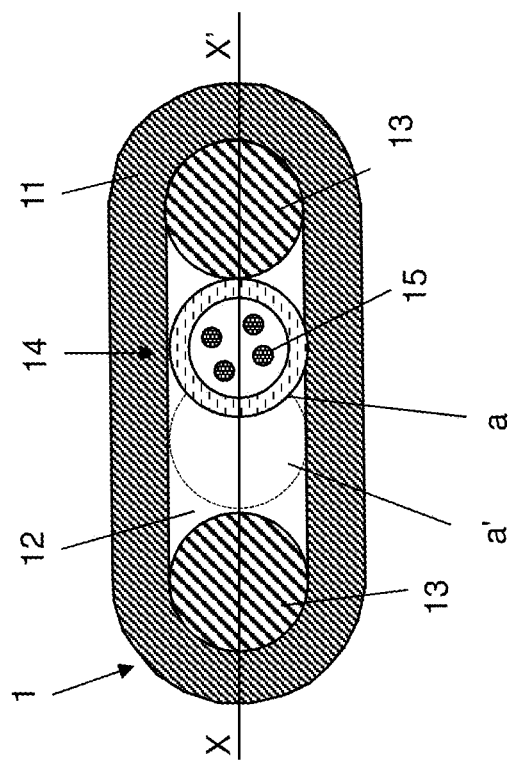
FIG. 2 schematically shows a cross-section of a flat optical drop cable according to a first embodiment of the present invention.

FIG. 2 schematically shows a cross section of a flat optical drop cable 1 according to a first embodiment of the present invention.

Preferably, the flat optical drop cable 1 comprises: an outer sheath 11 forming a cavity 12, the cavity being a stadium-shaped cavity; two strength members 13; and an optical fiber element 14 comprising one or more optical fibers 15.

Preferably, the outer sheath 11 is made of a polymer material. More preferably the polymer material is one or a combination of: polyethylene (PE), PELD (Polyethylene Low-Density), PP (Polypropylene), PA (Polyamide), LSOH (Low Smoke Zero Halogen) polymer. According to the first embodiment, the thickness of the outer sheath 11 may be equal to 0.75 mm.

Preferably, the strength members 13 are located inside the cavity, each one of the strength members 13 being located at a corresponding curved side of the cavity. In particular, each strength member 13 is located at a respective short curved side of the cavity 12 such that its outer surface is in contact with the inner surface of the outer sheath 11. Preferably, the strength members 13 are GRP rods. According to the first embodiment of the present invention, the diameter of each GRP rod 13 may be equal to 1.8 mm and the two strength members 13 may be separated by a distance of 3 mm. Moreover, the strength member Young's modulus may be equal to 50 GPa and the linear coefficient of thermal expansion may be equal approximately to $5.9 \times 10^{-6}$ mm/mm/° C. ($°$ C.$^{-1}$).

According to this embodiment of the present invention, the optical fiber element 14 is preferably a buffer tube enclosing the one or more optical fibers 15. Preferably, the buffer tube 14 is filled with a gel. Exemplary gels that may be used are the thixotropic filling gel Infogel K-880 provided by Indore Composite Pvt. Ltd., or the Unigel 400N provided by UNIGEL UK Ltd. The material of the buffer tube 14 is preferably polybutylene terephthalate (PBT). Examples of materials for the buffer tube are BASF Ultradur® B 6550 LN by BASF Corporation, or Spesin® KP270EX LN by KOLON PLASTICS, Inc. The buffer tube 14 has preferably the same diameter of the strength members, namely, according to the exemplary value reported above, a diameter of 1.8 mm.

The exemplary flat optical drop cable 1 as described above has a width equal to 8.1 mm, a height equal to 3.3 mm and a cable cross section equal to about 24.4 mm².

The buffer tube 14 preferably oscillates between the two GRP rods 13 in the oscillation plane according to a pattern of period P. The oscillation plane, which coincides with the longitudinal plane of the cable, is indicated in FIG. 2 as plane X-X'. The oscillation may have a saw-tooth pattern or a sinusoidal pattern. FIG. 2 shows the farthest positions a, a', of the optical fiber element 14 inside the cavity 12 due to the oscillation pattern. The peak-to-peak amplitude is the distance between these two farthest positions and is substantially equal to the distance between the two strength members 13. In the exemplary cable described above with reference to this first embodiment of the present invention, the peak-to-peak amplitude is hence equal to 3 mm and the ratio between the peak-to-peak amplitude and the diameter of the optical fiber element 14 is equal to nearly 1.7.

Different tests have been conducted by the inventors in order to investigate the performance of the cable according to this first embodiment and to determine its geometry, starting from the exemplary values reported above. The inventors used equations [1]-[5] above and found that using a period P equal to 196 mm, the same allowable fiber working strain of 0.51% of the standard cable can be achieved by the exemplary cable described above under the tensile load of 1350 N. However, the cable described above is thinner than the standard cable (by 26%), and the volume is considerably reduced (by 34%). If the tensile load is increased to 2025 N, the same allowable fiber working strain of 0.51% may be maintained by reducing the period P to 62 mm. If the working temperature deviation is increased to 80° C., the same allowable fiber working strain of 0.51% may be maintained by further reducing the period P to 60 mm.

As can be appreciated from the above, by using the oscillating buffer tube 14 between the two strength members 13, the inventors designed a cable according to a first embodiment of the present invention having a reduced height with respect to the standard cable (from 4.5 mm to 3.3 mm), a reduced volume (from 37.5 mm² to 24.4 mm²), and showing a same performance as the standard cable (in terms of the allowable fiber working strain) when the maximum working tensile load increased from 1350 N to 2025 N and the allowable temperature deviation increased from 40° C. to 80° C.

Figure 3:
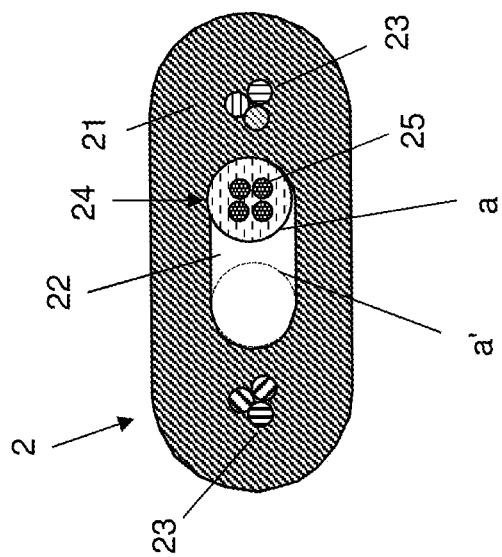
FIG. 3 schematically shows a cross-section of a flat optical drop cable according to a second embodiment of the present invention.

FIG. 3 schematically shows a cross section of a flat optical drop cable 2 according to a second embodiment of the present invention.

Preferably, the flat optical drop cable 2 comprises: an outer sheath 21 forming a cavity 22, the cavity being a stadium-shaped cavity; strength members 23; and an optical fiber element 24 comprising one or more optical fibers 25.

The outer sheath 21 is preferably made of a polymer material. More preferably the polymer material is one or a combination of: polyethylene (PE), PELD (Polyethylene Low-Density), PP (Polypropylene), PA (Polyamide), LSOH (Low Smoke Zero Halogen) polymer. According to this second embodiment of the present invention, the thickness of the outer sheath 21 may be nominally equal to 0.75 mm.

According to this second embodiment, each strength member 23 is a strand of wires. In particular, each strength member 23 may contain three brass clad steel wires helically wound with a lay length that may be equal to, e.g., 25 mm. According to this second embodiment, the strength member 23 may have an equivalent diameter of 0.9 mm, a Young's modulus of 71.5 GPa and a linear coefficient of thermal expansion of approximately $13 \times 10^{-6}$ mm/mm/° C. ($°$ C.$^{-1}$). Preferably, the strength members 23 are embedded in the outer sheath 21 in the vicinity of the two opposite short curved sides of the cavity 22.

The optical fiber element 24 of the cable according to the second embodiment of the present invention is preferably a tight bundle of fibers. The fibers are preferably encapsulated in an acrylate layer. The diameter of the bundle 24 may be 1.1 mm.

The fiber bundle 24 preferably oscillates within the cavity 22 in the oscillation plane according to a pattern of period P. The oscillation may have a saw-tooth pattern or a sinusoidal pattern. The fiber bundle 24 has no fiber over-feed. FIG. 3 shows the farthest positions a, a', of the optical fiber element 24 inside the cavity 22 due to the oscillation pattern.

Different test have been conducted by the inventors in order to investigate the performance of the exemplary cable described so far with reference to the second embodiment of the present invention and to determine its geometry. The inventors used equations [1]-[5] and found that if a cable width of 8.1 mm is considered (namely, the same width of the cables considered herein above), by considering a distance between the strength members equal to 4.4 mm, a period P of 92 mm assures an allowable fiber working strain of 0.51% at a load of 1350 N. However, as the wires are smaller with respect to the rods of the exemplary cable described above with reference to the first embodiment of the present invention, the cable height is reduced to 2.6 mm. The cable cross section area is thus equal to 17.2 mm². Additionally, the inventors reduced the distance between the strength members to 2.5 mm. In this case, to maintain the same allowable fiber working strain of 0.51% at a load of 1350 N the required period P is 39 mm. This further reduces the cable width from 8.1 mm to 6.2 mm. The cable cross section area hence reduces to 12.7 mm² and the resultant cable weight is 0.17 N/m. As compared to the standard cable of FIG. 1, the cable cross section area of the exemplary cable according to the second embodiment of the present invention is reduced by 66%.

In Table 1, the exemplary flat optical drop cable according to the first embodiment and the exemplary flat optical drop cable according to the second embodiment are compared with the standard flat optical drop cable of the type represented in FIG. 1. In Table 1, the standard flat optical drop cable is indicated as "cable A", the exemplary cable according to the first embodiment of the present invention is indicated as "cable B" and the exemplary cable according to the second embodiment of the present invention is indicated as "cable C".

TABLE 1

| | cable A | cable B | cable C | |
|---|---|---|---|---|
| cable width | 8.1 | 8.1 | 6.2 | mm |
| cable height | 4.5 | 3.3 | 2.6 | mm |
| sheath thickness | 0.75 | 0.75 | 0.75 | mm |
| cable cross section area | 37.5 | 24.39 | 12.7 | mm² |
| cable weight | 0.34 | 0.31 | 0.17 | N/m |
| buffer tube excess | 0.04 | 0.01 | 0.00 | % |
| strength member modulus | 5.00E+10 | 5.00E+10 | 7.15E+10 | Pa |
| strength member diameter | 0.0018 | 0.0018 | 0.0009 | m |
| distance between strength members | — | 3.0 | 2.5 | mm |
| optical fiber element diameter | 3.0 | 1.8 | 1.1 | mm |
| Period | — | 60 | 39 | mm |

It is to be noticed that signs "-" in the table above indicate, respectively, that, in the standard cable, there is no space allowed for the optical element oscillation and that the computed oscillation period is so large that the optical element is virtually straight.

Table 2 illustrates the performance of the exemplary cables described herein above, as compared with the standard cable. The cables have been tested in aerial applications under exemplary environmental loads. The cables have been subjected to combined ice loading measuring 3 mm in radial thickness, and horizontal cross loads due to 97 km/h wind.

TABLE 2

| | cable A | cable B | cable C | |
|---|---|---|---|---|
| cable ice loading (3 mm) | 0.83 | 0.79 | 0.67 | N/m |
| cable wind loading (97 km/h) | 6.41 | 6.41 | 5.55 | N/m |
| vertical load | 1.17 | 1.10 | 0.84 | N/m |
| tensile load | 6.52 | 6.51 | 5.61 | N/m |
| maximum span (3 mm ice, 97 km/h) | 74 | 74 | 114 | m |
| vector sag @ 50 span (3 mm ice, 97 km/h) | 3.00 | 3.00 | 2.75 | m |

As can be noticed from the values listed in the Tables above, cable B is smaller than cable A, and cable C is smaller that both cable B and cable A. As a consequence, the weight of cable C is considerably lower (0.17 N/m versus 0.34 N/m of the standard cable). Moreover both the ice loading and the wind loading of cable C are lower. In particular, the ice loading is 19% lower (0.67 N/m versus 0.83 N/m) and the wind loading is 13% lower (5.55 N/m versus 6.41 N/m). As a consequence, the maximum span of cable C is considerably greater than the maximum span of the other two cables (114 m versus 74 m), while the sag are similar (2.75 versus 3.00).

Figure 4:
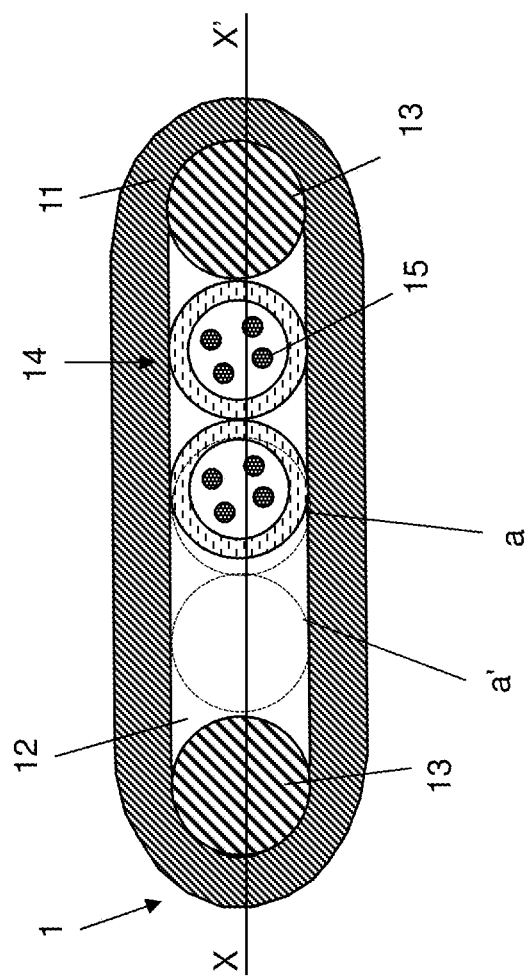
FIG. 4 schematically shows a cross-section of a flat optical drop cable according to a first variant of the first embodiment of the present invention.

FIG. 4 schematically shows a cross-section of a flat optical drop cable according to a first variant of the first embodiment of the present invention. In FIG. 4 the same reference numbers of FIG. 2 have been used. According to this first variant, multiple optical fiber elements 14 are housed in the cavity 11 of the flat optical drop cable 1. The multiple optical fiber elements 14 are placed side-by-side in the longitudinal plane within the cavity 11 of the flat optical drop cable 1. FIG. 4, in particular, shows two buffer tubes housed in the cavity of the flat optical drop cable. The width of the cable according to this first variant may be equal to 10.0 mm and the height of the cable may be equal to 3.5 mm.

FIG. 5 schematically shows a cross-section of a flat optical drop cable according to a second variant of the first embodiment of the present invention. Also in FIG. 5 the same reference numbers of FIG. 2 have been used. According to this second variant, the flat optical drop cable 1 comprises, within the cavity 11, a buffer tube 14 housing a number of optical fibers 15, two strength members 13 in the form of GRP rods and a number of conductive elements 16 in the form of insulated copper wires. The number of insulated copper wires 16 are interposed between the optical fiber element 14 and one strength member 13. The width of the cable according to this second variant may be equal to 10.0 mm and the height of the cable may be equal to 3.5 mm.

FIG. 6 schematically shows a cross-section of a flat optical drop cable according to a third variant of the first embodiment of the present invention. Also in FIG. 6 the same reference numbers of FIG. 2 have been used. According to this third variant of the first embodiment, a number of optical fiber elements 14 is housed in the cavity in a stacked configuration. FIG. 6 shows, for sake of non limiting example, four buffer tubes 14, each one oscillating in a respective oscillation plane (which is parallel to the longitudinal plane of the cable) between two farthest positions (a and a', b and b', c and c', d and d'), wherein two buffer tubes 14 are located on top of the other two. According to this third variant of the first embodiment, the strength members 13 are GRP rods embedded within the outer sheath 11 at the two opposite short curved sides of the flat optical drop cable 1. The width of the cable according to this third variant may be equal to 12.5 mm and the height of the cable may be equal to 6.5 mm.

Figure 7:
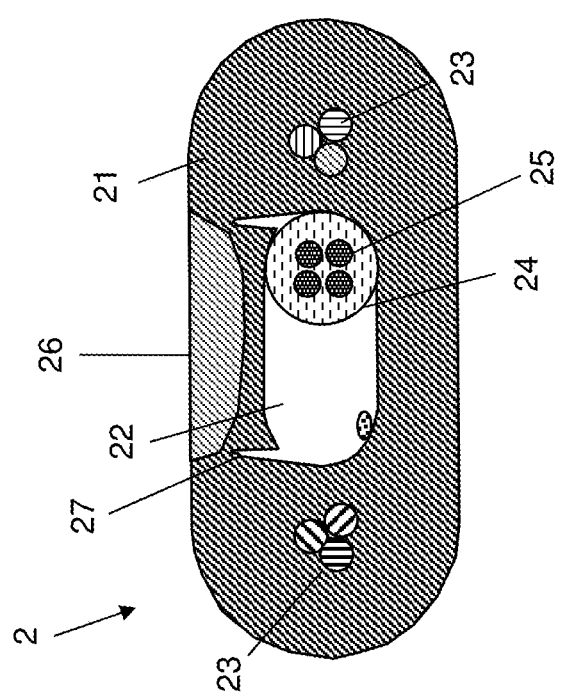
FIG. 7 schematically shows a cross-section of a flat optical drop cable according to a first variant of the second embodiment of the present invention.

FIG. 7 schematically shows a cross-section of a flat optical drop cable according to a first variant of the second embodiment (FIG. 3) of the present invention. In FIG. 7 the same reference numbers of FIG. 3 have been used. According to this first variant of the second embodiment, the cable 2 may have a width equal to 6.2 mm and height equal to 2.6 mm. The cable comprises an acrylate fiber bundle 24 comprising a number of optical fibers (e.g. four), a PE outer sheath 21, two strength members 23, each one in the form of three stranded brass clad wires. The cavity 22 may contain water blocking material, taper or yarns, and optionally a water swellable thread. The cable preferably comprises, in a portion of the outer sheath over one of the elongated sides of the cavity 22, a stripe 26. The stripe 26 may be made of a colored material to identify the cable. Moreover, the outer sheath 21 may comprise, in its inner surface, two concave ridges 27, which form an easy-peel window together with the stripe 26. The easy-peel window allows easy opening of the outer sheath and subsequent extraction of the optical fiber element for an efficient fiber management inside a connectivity equipment.

It is to be noticed that, even if the easy-peel window has been described above with reference to the first variant cable of the second embodiment of the present invention, this is not limiting since also the other cables described in the present application may comprise a similar easy-peel window.

Figure 8:
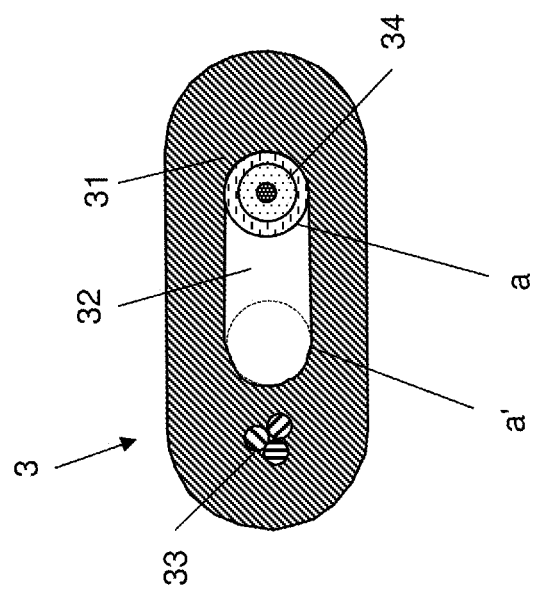
FIG. 8 schematically shows a cross-section of a flat optical drop cable according to a third embodiment of the present invention

FIG. 8 schematically shows a cross-section of a flat optical drop cable 3 according to a third embodiment of the present invention.

Preferably, the flat optical drop cable 3 comprises: an outer sheath 31 forming a cavity 32, the cavity being a stadium-shaped cavity; strength members 33; and an optical fiber element 34.

The optical fiber element 34 is preferably a sub-unit comprising a single fiber cable (SFC) comprising a single tight buffer fiber surrounded by aramid yarn and protected by a flame retardant LSOH (Low Smoke Zero Halogen) sheath. The optical fiber element 34 may have a diameter equal to 2.2 mm.

The outer sheath 31 may have a thickness equal to 1 mm and it may be made by Medium Density Polyethylene (PEMD).

According to a variant not shown in the Figures, the strength members may be in the form of GRP rods embedded in the outer sheath. According to another variant, the strength members may be steel strands. According to the variant schematically shown in FIG. 8, a single strength member 33 in the form of stranded steel wires is embedded in the outer sheath 31.

The SFC 34 preferably oscillates within the cavity 32 in the oscillation plane according to a pattern of period P. The oscillation may have a saw-tooth pattern or a sinusoidal pattern. FIG. 8 shows the extreme positions a, a', of the optical fiber element 34 inside the cavity 32 due to the oscillation pattern. The peak-to-peak amplitude is the distance between these two extreme positions and in this case it substantially corresponds to the width of the cavity 32.

Different tests have been conducted by the inventors in order to determine the geometry of an exemplary cable according to this third embodiment.

The exemplary cable has been compared to a standard cable comprising the same type of optical fiber element as described above, tightly embedded in the outer sheath. This standard cable is not shown in the drawings. The standard cable used for comparison is a Prysmian Resilink™ USD Flat Drop cable manufactured by the Prysmian Group, 700 Industrial Drive, Lexington, S.C. 29072. The standard cable used for comparison has a width equal to 8.5 mm, a height equal to 4.9 mm and a cross section area equal to 41.9 mm². It comprises also two strength members in the form of GRP rods at the two opposite sides of the cable, spaced by 2.9 mm. This standard cable shows an allowable fiber working strain of 0.55% at a maximum working load of 1350 N.

The inventors applied equations [1]-[5] to the cable according to this third embodiment and found that, with a spacing of the strength members equal to 2.9 mm, the optical fiber element may oscillate with a period P of 86 mm in order to have an allowable fiber working strain of 0.55% at a load of 1485 N (10% higher than the maximum working load of the standard cable). By replacing the GRP rods with the steel strands, the inventors found that the cable according to this third embodiment may be made smaller while maintaining an allowable fiber working strain of 0.55% at a load of 1350 N. In particular, the width may be reduced to 7.4 mm while maintaining a spacing between the strength members equal to 3.6 mm, with a resulting cross section area of 32.8 mm², with an oscillation period P equal to 40 mm.

Herein after, an apparatus 9 for manufacturing a cable according to the embodiments of the present invention will be described.

Figure 9:
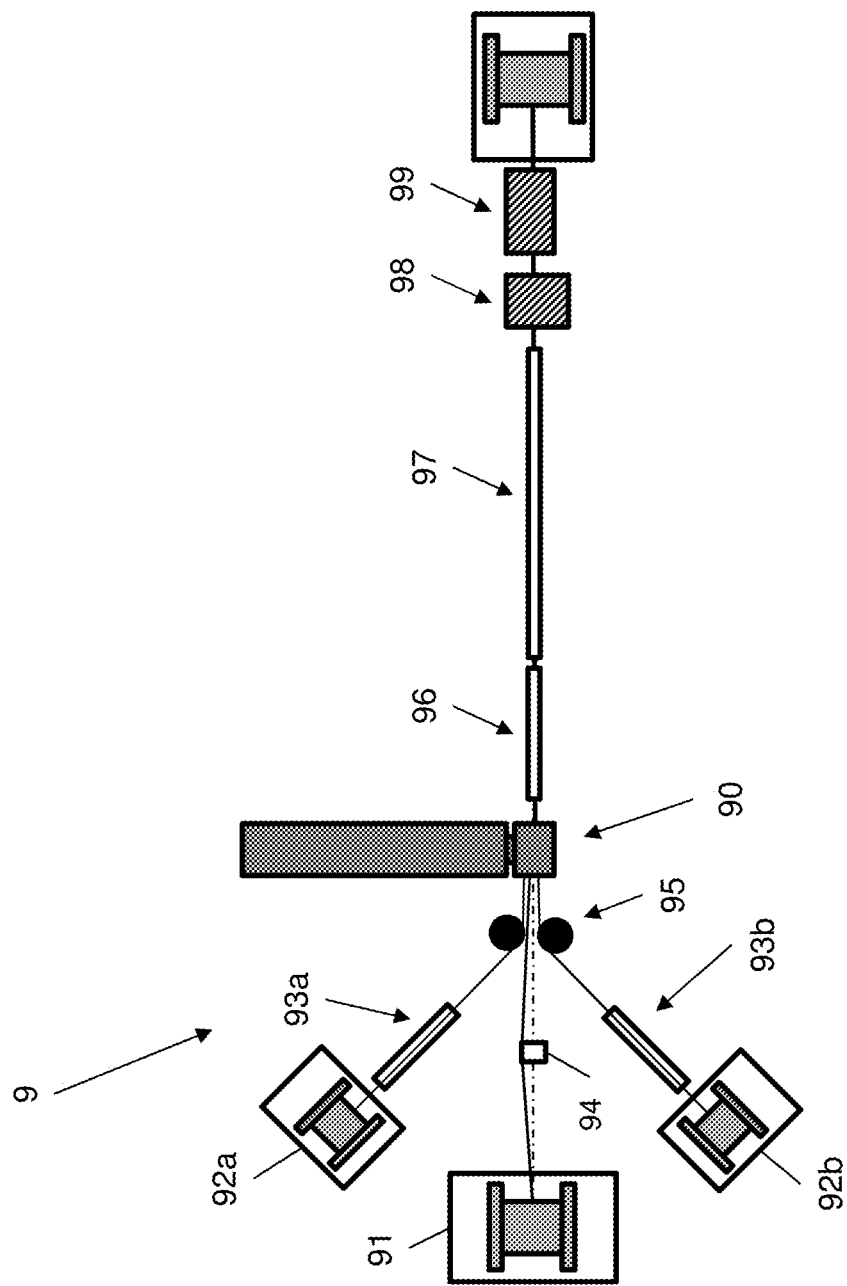
FIG. 9 is a block scheme of an apparatus for manufacturing the flat optical drop cable according to embodiments of the present invention.

As shown in FIG. 9, the apparatus 9 comprises an extrusion head 90. The apparatus 9 further comprises a number of pay-off machines. FIG. 9 shows three pay-off machines, a first pay-off machine 91 for the optical fiber element and second and third pay-off machines 92a, 92b for the strength members. Each pay-off machine 92a, 92b for the strength members may be equipped with a respective pre-heater 93a, 93b, which heats a metallic strength member at the output of the pay-off machine, e.g. with hot air at about 370° C. over 2 meters.

The optical element pay-off-tension is nominally equal to about 1250 g, while the stranded steel pay-off tension is nominally equal to about 600 g.

The optical fiber element output by the pay-off machine 91 is passed through an oscillator 94 which provides the required oscillation pattern (e.g. circular pattern). Then, the strength members and the optical fiber elements are gathered in the extrusion head 90 by passing through deflector pulleys 95.

In the extrusion head 90, the polymer sheath is extruded in the required shape about the strength members and the optical fiber element.

At the output of the extrusion head 90, the apparatus 9 may optionally comprise a vacuum trough 96. The apparatus 9 preferably comprises a cooling trough 97 for cooling the extruded cable and a dryer 98 for drying the extruded cable by means of air knives or similar devices.

The cable may be subject to continuous measurement at a measurement equipment 99, before being wound on a drum at a controlled tension. The tension may also be controlled along the production line described herein above by using additional driven capstans or driven caterpillar belts not shown in FIG. 9.

Figure 10:
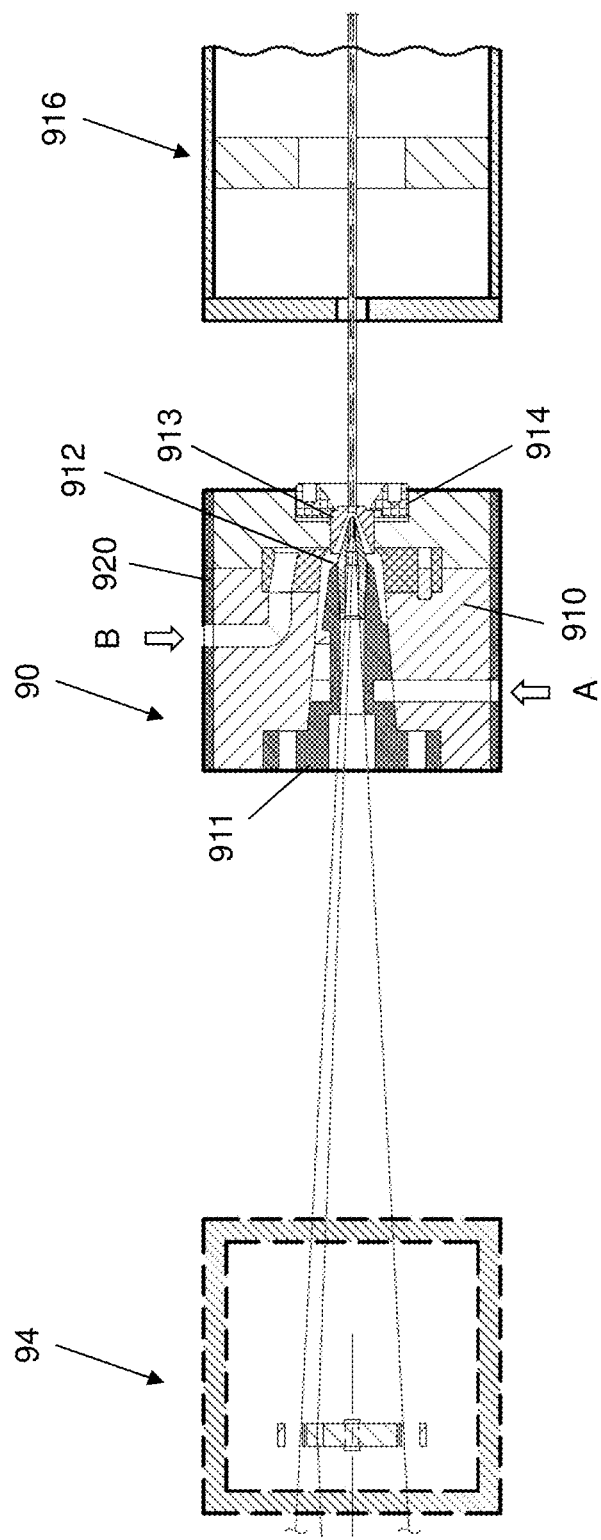
FIG. 10 is a section view of a portion of the apparatus of FIG. 9, the portion comprising an oscillator and an extrusion head.

FIG. 10 shows in further detail the extrusion head 90 and the oscillator 94 comprised in the apparatus 9, according to an embodiment of the present invention. FIG. 10 also shows a portion 916 of the cooling trough 96, 97.

The extrusion head 90 has a body 910 maintained at a pre-defined temperature by electrical heating 920. The body 910 comprises a cartridge 911, a core tube 912 and a die 913 supported by a die nut 914.

Herein after, the operation of the extrusion head 90 and the oscillator 94 will be described with reference to, for sake of example, the manufacture of cable C described above. In this case, two stranded steel wires pass through the extrusion head 90. The optical fibres incorporated in the fiber bundle pass through the oscillator 94 and then through the extrusion head 90. The oscillator 94 continuously moves the fiber bundle incorporating the optical fibres in a circular motion. Then, in the core tube 912 of the extrusion head 90, the movement of the fiber bundle is restricted to a plane (namely, the oscillation plane), so that the fiber bundle moves in a flat, planar, sinusoidal oscillation pattern between the strength members and within the cable sheath.

The sheath material is fed to the extrusion head 90 and pressurized into the extrusion head 90 at position indicted by arrow "A" in FIG. 10. Then, the sheath material flows about the cartridge 911 and within the die 913 about the core tube 912. A further material may be pressurized into the extrusion head 90 at position indicated by arrow "B" in FIG. 10 and co-extruded with the material of the outer sheath. This further material may flow about a striping plate 915 and may form part of the easy peel window described above with reference to the variant of the second embodiment of the present invention illustrated in FIG. 7. The sheath material and optionally the further material are then extruded over the steel wires. The core tube 912 and the die 913 are preferably designed so as to produce a void in which the fiber bundle may oscillate. The void is such that the fiber bundle is maintained in an oscillation pattern without excessive side loading acting upon the fiber bundle. This may be adjusted by varying process parameters such as the distance between the core tube 912 and the die 913, by rotating the die nut 914.

The extruded cable is then preferably air cooled in the cooling trough 96 before entering a water cooling trough 916. The water cooling trough may be a vacuum trough in which the water is at lower pressure than the atmosphere inside the cable. In this way, the cable shape may be maintained while the material is cooling. The negative water pressure in the water cooling trough 916 is maintained at typically about −280 mbar.

Figure 11:
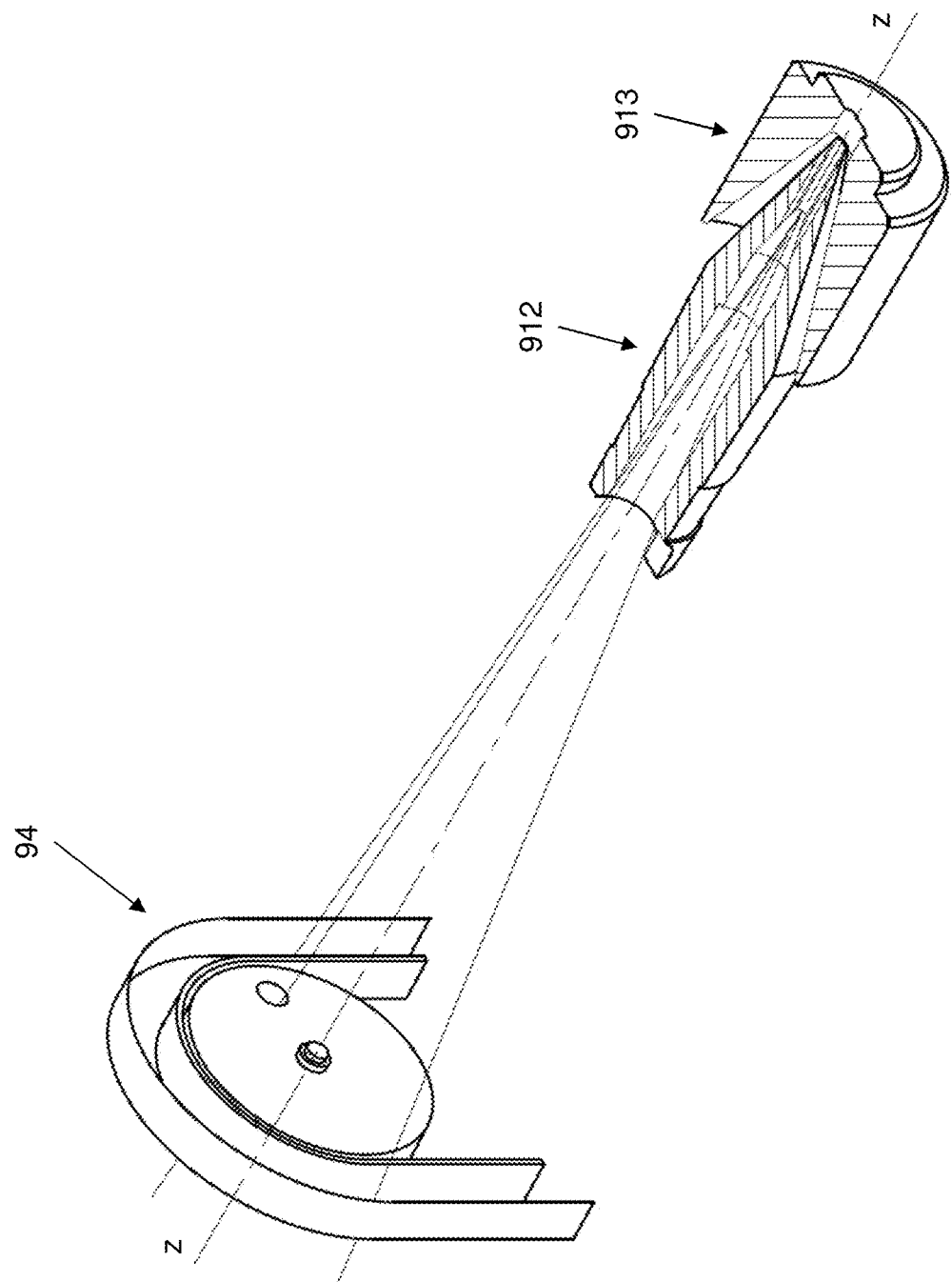
FIG. 11 is another section view of the oscillator and the extrusion head of FIG. 10.

FIG. 11 shows in further detail the oscillator 94. FIG. 11 also shows the core tube 912 and the die 913 comprised in the extrusion head 90, according to an embodiment of the present invention.

The core tube 912 preferably has a hollow body extending along an axis z (indicated also as "feeding direction") and having a tapered end. The tapered end is provided with a number of holes configured to allow the passage of the strength members. Indeed, as shown, the strength members by-pass the oscillator 94 and are kept in a fixed position within the cable as they pass through the holes of the tapered end of the core tube 912. Conversely, the fiber bundle is oscillated by the oscillator 94 in a circular pattern and is then maintained fixed in the oscillation plane as it moves within a horizontal slot in the core tube 912.

According to the present invention, flat optical drop cables are provided in which at least one optical fiber element may be advantageously over-fed into the cable, while the cable still retains a flat shape. This is achieved by oscillating the optical fiber element inside the cable while maintaining the optical fiber element fixed in its oscillation pattern by the outer sheath of the cable. This minimizes the optical fiber migration inside the cable. The oscillation pattern allows to compensate for the environmental or mechanical loads without inducing stress on the optical fibers. The cable has advantageously a reduced size with respect to known flat optical drop cables.

The invention claimed is:

1. An optical cable comprising:
 a cavity shaped in the form of a stadium in a sectional view of the optical cable;
 an outer sheath enclosing the cavity;
 a first strength member; and
 a first optical fiber element disposed in the cavity, the first optical fiber element comprising an optical fiber, wherein the first optical fiber element comprises an oscillating pattern within the cavity on an oscillation plane parallel to a longitudinal plane of the cable, wherein a height of the cavity in the sectional view substantially corresponds to a height of the first optical fiber element, wherein the cable is a flat drop cable, and wherein a diameter of the first optical fiber element is comprised between 0.5 mm and 3.0 mm, a period of oscillation of the first optical fiber element is comprised between 30 mm and 300 mm and a ratio between a peak-to-peak amplitude of the oscillation and width of the first optical fiber element is comprised between 1.3 and 5.

2. The cable according to claim 1, wherein the first strength member comprises a GRP rod or a yarn or stranded steel wires.

3. The cable according to claim 1, wherein the first optical fiber element oscillates within the cavity according to a sinusoidal pattern or a zig zag pattern.

4. The cable according to claim 1, further comprising a second strength member, wherein the first and the second strength members are disposed in the cavity, wherein the cavity comprises two opposite curved sides, the first strength member and the second strength member being located at the opposite curved sides of the cavity.

5. The cable according to claim 4, wherein the first optical fiber element is a loose tube enclosing the optical fiber.

6. The cable according to claim 1, further comprising a second strength member, wherein the first and the second strength members are embedded within the outer sheath, each one of the first and the second strength members being located in a vicinity of a respective one of opposite curved sides of the cavity.

7. The cable according to claim 6, wherein the first optical fiber element is a tight fiber bundle comprising the optical fiber.

8. The cable according to claim 1, wherein the first optical fiber element is a sub-unit comprising a single fiber cable.

9. The cable according to claim 1, wherein the cavity comprises two opposite elongated sides, and the cable comprises, in a portion of the outer sheath over one of the elongated sides, a stripe suitable for identifying the cable, and wherein the outer sheath comprises two concave ridges, which together with the stripe provide an easy-peel window.

10. A process for manufacturing an optical cable, the process comprising:
 providing a first strength member and a first optical fiber element comprising an optical fiber;
 moving the first optical fiber element to provide an oscillating motion to the first optical fiber element; and
 forming the optical cable to be a flat drop cable by extruding an outer sheath about the first strength member and the first optical fiber element, wherein the extruding comprising capturing the oscillating motion of the first optical fiber element in an oscillating pattern within a cavity enclosed by the outer sheath, the cavity being shaped in the form of a stadium and having a height substantially corresponding to a height of the first optical fiber element.

11. The process according to claim 10, wherein moving the first optical fiber element comprises oscillating the first optical fiber element so that oscillating pattern within the cavity comprises a sinusoidal pattern or a zig zag pattern.

12. The process according to claim 10, further comprising:
 providing a second strength member, wherein providing the first and the second strength members comprises providing the first and the second strength members disposed in the cavity, wherein the cavity comprises two opposite curved sides, the first strength member and the second strength member being located at the opposite curved sides of the cavity.

13. The process according to claim 12, wherein the first optical fiber element is a loose tube enclosing the optical fiber.

14. The process according to claim 10, further comprising providing a second strength member, wherein providing the first and the second strength members comprises providing the first and the second strength members embedded within the outer sheath, each one of the first and the second strength members being located in a vicinity of a respective one of opposite curved sides of the cavity.

15. The process according to claim 14, wherein the first optical fiber element is a tight fiber bundle comprising the optical fiber.

16. The process according to claim 10, wherein the extruding further comprises:
   forming the cavity comprising two opposite elongated sides;
   forming, in a portion of the outer sheath over one of the elongated sides, a stripe suitable for identifying the cable; and
   forming the outer sheath to comprise two concave ridges, which together with the stripe provide an easy-peel window.

17. An apparatus for manufacturing an optical cable, the apparatus comprising:
   a first pay-off machine for providing a first optical fiber element;
   a second pay-off machine for providing a first strength member;
   an oscillator for moving the first optical fiber element to provide an oscillation motion to the first optical fiber element; and
   an extrusion head for forming the optical cable to be a flat drop cable by extruding an outer sheath about the first strength member and the first optical fiber element, wherein the extruding comprising capturing the oscillating motion of the first optical fiber element in an oscillating pattern within a cavity enclosed by the outer sheath, the cavity being shaped in the form of a stadium and having a height substantially corresponding to a height of the first optical fiber element.

18. The apparatus according to claim 17, wherein the extrusion head comprises a core tube and a die, the core tube comprising a hole for passing the first strength member and a horizontal slot for passing the first optical fiber element and maintaining fixed in an oscillation plane the first optical fiber element as it moves according to the oscillation pattern.

19. The apparatus according to claim 17, further comprising a cooling trough comprising a water cooling trough, the water cooling trough being a vacuum trough in which the water is at lower pressure than the atmosphere inside the cable.

20. The cable according to claim 1, wherein the first optical fiber element comprises a buffer tube comprising a plurality of optical fibers.

\* \* \* \* \*